Oct. 28, 1969 R. E. LINDGREN ET AL 3,475,564

SYSTEM FOR SELECTIVELY REPRODUCING SIGNALS RECORDED AT DIFFERENT LEVELS

Filed Nov. 8, 1966

INVENTORS
RAYMOND E. LINDGREN
SVANTE THEODORE WICKSTROM
BY
Carpenter, Kinney & Coulter
ATTORNEYS

1

3,475,564
SYSTEM FOR SELECTIVELY REPRODUCING SIGNALS RECORDED AT DIFFERENT LEVELS

Raymond E. Lindgren, St. Paul, and Svante Theodore Wickstrom, North St. Paul Village, Minn., assignors to Minnesota Mining and Manufacturing Company, St. Paul, Minn., a corporation of Delaware Filed Nov. 8, 1966, Ser. No. 592,814
Int. Cl. G11b *5/02*
U.S. Cl. 179—100.2 7 Claims

ABSTRACT OF THE DISCLOSURE

A system utilizing a recording medium having program signals recorded thereon and low level information signals recorded thereon between program signals. The reproduced signals are selectively switched between two different parallel resistive circuits to audibly reproduce the lower level information signals at the listening level of the program signals and thus enable the listener to hear the normally inaudible information signal giving the title, etc., of the preceding program or musical selection.

Figure 1:
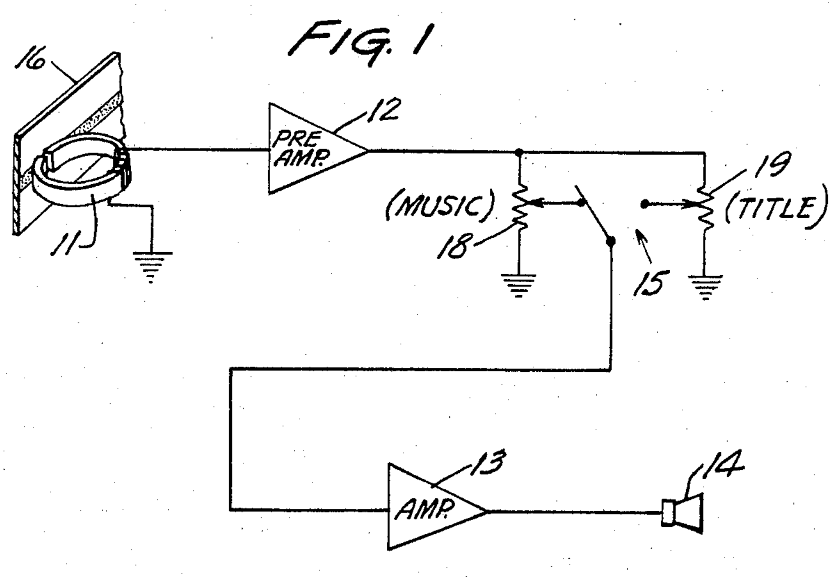

This invention relates to a signal reproducing system and in one aspect to a signal reproducing system utilizing a recording medium having program signals and information signals recorded thereon at substantially different levels in a single channel wherein the system normally reproduces the program signals and selectively reproduces the informational signals. The signal reproducing system of the present invention has particular utility when incorporated into a background music device providing a selection identification feature.

Background music systems do not usually provide announcements of the titles of the musical selections since it would be a distracting influence. However, there are times when the listener, particularly in the school or home, would like to know the title of a selection upon its completion.

Known reproducing systems include means for selectively reproducing one of two or more recorded signals from a medium having at least two or more channels. Such systems are disclosed, for example, in United States Letters Patent Nos. 2,995,630, 3,194,895 and 3,245,156.

In such known systems, each channel contains recorded information which differs from the information recorded in the other channel. In these known reproducing systems, means are provided for selectively switching from one channel to the second channel wherein different recorded signals from each channel are reproduced at substantially the same level. Thus, a continuous signal is produced by the reproducing system from the recorded signals selectively reproduced from the two different channels.

Adaption of the known devices for use in a reproducing system, such as for example in a background music system having a selection identification feature, would require selective switching between a music channel and a title channel. However, one disadvantage of the prior art devices is that an additional channel or tape track is required thereby reducing by one-half the amount of medium available for recorded music. In background music applications, it is desirable to record the maximum amount of music onto a medium whereby a long playing time can be obtained between repeats of musical selections or changes of medium. Another disadvantage of utilizing the known devices is that the complexity and cost of the reproducing system would be considerably increased in that an additional reproducing head, or means for moving a single reproducing head, and circuitry are needed for the second channel.

2

The present invention overcomes the disadvantages of the prior art in that only a single channel is utilized to record in a predetermined manner a program signal at a normal recording level and an informational signal at a substantially lower recording level, say for example in the order of ten-to-one recording level ratio between the program and informational signals, each of which are reproduced by the same transducing head. In normal operation, only the program signal is reproduced by the reproducing system. When a control means is selectively actuated, the same transducing head and substantially the same amplifying circuitry reproduce the informational signal at an audile level which is substantially the same as that for the program signal.

In one embodiment, the program signal may be musical selections recorded on a medium at a normal recording level and the informational signals may be the title of a particular musical selection recorded at a substantially lower level than the musical selection.

The present invention provides an improved and less complex system for identification of musical selections in a background music system. Further, the system provides the listener with an external manually controlled switch, the actuation of which affords audible reproduction of a normally inaudible voice recording of the title of the musical selection just completed.

This is all accomplished by merely imparting or recording on the medium, after each musical selection and along the same channel, the title of the selection at a recording level which is inaudible at normal program levels. However, the title of the selection can be made audible by instantaneously increasing the amplification factor by actuation of a simple control device.

Figure 2:
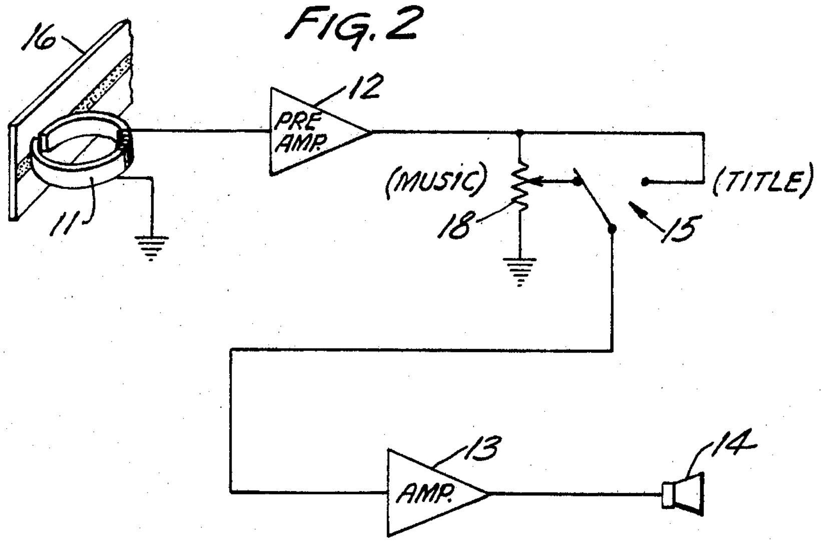

The following description may be more readily understood by reference to the accompanying drawing in which:

FIGURE 1 represents a diagrammatic representation of an embodiment of the present invention in which magnetic tape is used; and FIGURE 2 represents an alternative embodiment likewise utilizing magnetic tape.

Referring now to FIGURE 1, the signal reproduction system includes a transducing means such as a magnetic reproducing head 11, amplifying means, normally including in magnetic reproducing apparatus a preamplifier 12 and a power amplifier 13 as illustrated, and a means for rendering electrical signals audible such as a speaker 14. The signal reproducing system is also provided with a control means including an externally operable switch means or switch 15 which may be, for example, a single-pole double-throw switch, as illustrated, having a normal position at one of the two contacts and having three terminals. The magnetic reproducing head 11 cooperates with a recording medium 16, which may be a magnetic tape, having a single channel recorded thereon. The medium 16 may be any signal retention medium having signals imparted thereto at substantially different levels and spaced successively in a single channel. Switch 15 is operatively connected between the preamplifier 12 and power amplifier 13 and functions to switch power amplifier 13 into series circuit with a signal attenuating means such as one or the other of two parallel volume control potentiometers 18 and 19. The control means or switch 15 affords an abrupt or instantaneous increase in the sensitivity of the amplifier rather than a progressive increase as would be the case, for example, if the potentiometer were adjusted along its range of settings and affords instantaneous return of the sensitivity to the prior setting. The potentiometer 18 is a normal operating volume control and potentiometer 19 is an alternate volume control.

In one application, the potentiometer 18 is adjusted to a normal volume level and potentiometer 19 is preset to about ten times greater sensitivity than that to which the potentiometer 18 is adjusted.

In background music applications where magnetic tape is utilized the musical selections are prerecorded on the magnetic tape at a normal program level, say in the order of 50 decibels, and the intervening voice, which identifies the immediately preceding selection, is prerecorded at a level about ten times less than the normal program level, or at about 30 decibels. Both the music and voice are recorded on the same channel or track.

It has been found that the signal level ratio of about ten to one between the normal program signal level and the lower informational signal level is optimum since a lower ratio results in the identification signal becoming audible at normal operating volume levels and a higher ratio results in bringing out too much of the background noise along with the voice. The ratio limits for best results are from ten to one to fifteen to one.

Referring again to FIGURE 1, during normal operation when the prerecorded music is being reproduced, the switch 15 positions the contact to place potentiometer 18 in series with the preamplifier 12 and the power amplifier 13. When the switch 15 is selectively moved to the alternate position at the end of a selection, when it is desired to have the selection identified, potentiometer 19 is in series with the preamplifier 12 and power amplifier 13 and the signals at the lower recording level are reproduced and amplified and rendered audible by speaker 14 at the same volume as the signals at the higher level were produced. Thus, by actuating the switch 15, the input to the power amplifier 13 is substantially the same in each position of the control switch.

FIGURE 2 of the drawing illustrates a simplified version in which the potentiometer 19, present in the embodiment illustrated in FIGURE 1, has been omitted in which case a lower resistance connection is made by switch 15 between the preamplifier 12 and power amplifier 13. In this manner the ten-to-one ratio is reached approximately if the typical users volume control setting is known to be normally set to about one-tenth of available sensitivity. This alternative embodiment has the advantage of eliminating one potentiometer.

In one application of the embodiment of FIGURE 2, the magnetic head 11 reproduces the music or program signal at about 100 microvolts ($\mu$v.) at 1000 cycles which is amplified by preamplifier 12 to about 1 volt. Potentiometer 18 reduces or attenuates the amplified program signal to about .1 volt and applies the same as an input to the amplifier 13. Conversely, the title or informational signals are reproduced at about 10 $\mu$v. and are amplified by preamplifier 12 to about .1 volt. When switch 15 is selectively moved to the alternate position to reproduce the title or informational signals, the .1 volt is applied directly to the amplifier 13. However, if the switch 15 was not moved at the end of the selection, the .1 volt signal applied to the potentiometer 18 would be reduced to .01 volt or to a level which would not result in a signal from amplifier 13 which would be audible when applied to the speaker 14.

It is also contemplated that other reproducing systems, transducing means and the like could be employed. Further, the attenuating means and external control means could be electrically connected between the transducing head and the preamplifier. This, however, would require shielding to eliminate normal noise.

Preferably, switch 15 is mounted outside the machine in a readily available location and has a normal position contacting potentiometer 18 such that the listener must hold a button depressed to maintain contact in its alternate actuated position at which the recorded signals identifying the selection are reproduced. When the title, and/or composer, arranger, conductor, etc., recording has stopped the button is released and the switch returns to its normal position.

What is claimed is:

1. A signal reproducing system for reproducing aural program presentations and selectively reproducing aural information presentations, said system being adapted for use with a recording medium having program signals recorded thereon at a first predetermined level and information signals recorded thereon between program signals and in the same track at a second predetermined level substantially lower than the program signal, said system comprising:

(a) transducer means for electrically reproducing said program signals and said information signals;

(b) amplifier means for receiving and amplifying electrical signals;

(c) speaker means operatively connected to said amplifier means to convert received electrical signals to an audible sound; and (d) control means including (1) a first electrical circuit operatively connected between said transducer means and said amplifier means for applying said program signals to said amplifier to afford reproduction of the aural program presentations by said speaker means at a desired listening level; and (2) a second electrical circuit parallel to said first circuit operatively connected between said transducer means and said amplifier means for applying said information signal to said amplifier to afford reproduction of the aural information presentations by said speaker means at a listening level substantially the same as the listening level of said program signal; and (3) switch means for selectively connecting one of sad first circuit and said second circuit to said amplifier means affording selectively the lower level information signals to be audibly reproduced at said listening level by operation of said switch means to connect said second circuit to said amplifier means and for substantially instantaneously returning to said listening level upon receiving said program signals by returning said switch means to connect said first circuit to said amplifier means.

2. The signal reproducing system of claim 1 wherein said system includes a preamplifier adapted to receive and amplify program signals and informational signals from said transducer means and to apply the amplified signals to said control means; and wherein said amplifier means includes a power amplifier operatively connected to said switch means and adapted to receive an attenuated program signal from said first circuit when said switch means is selectively connected to said first circuit and to receive the amplied informational signal from said second circuit when said switch means is selectively connected to said second circuit.

3. The signal reproducing system of claim 1 wherein said first electrical circuit includes a first attenuator for receiving and attenuating the program signal to a signal level about equal to the signal level of the informational signal, said attenuated program signal normally being applied to said amplifying means through said first electrical circuit and said informational signal being selectively applied through said second electrical circuit to said amplifying means in response to said switch means being selectively connected to said first circuit or said second circuit.

4. The signal reproducing system of claim 3 wherein said attenuator includes at least one potentiometer.

5. The signal reproducing system of claim 4 wherein said potentiometer affords attenuation of said program signal to a range of between about one-tenth to one-fifteenth of the unattenuated program signal.

6. The signal reproducing system of claim 4 wherein said second electrical circuit includes a second attenuator for receiving and attenuating the information signal, said first attenuator is adjusted to attenuate the program signal by an amount at least 10 times the amount of the attenuation by said second attenuator.

7. The signal reproducing system of claim 6 wherein the recording medium is magnetic tape, said program signals are musical selections recorded on said tape at about 50 decibels and said information signal includes the title of the preceding musical selection on said tape at about 30 decibels.

References Cited

UNITED STATES PATENTS

| | | | |
|---|---|---|---|
| 2,780,679 | 2/1957 | Vandivere | 179—100.1 |
| 3,068,326 | 12/1962 | Nowlan | 179—100.2 |

BERNARD KONICK, Primary Examiner

R. S. TUPPER, Assistant Examiner

UNITED STATES PATENT OFFICE

CERTIFICATE OF CORRECTION

Patent No. 3,475,564 Dated October 28, 1969

Inventor(s) Raymond E. Lindgren and Svante T. Wickstrom

It is certified that error appears in the above-identified patent and that said Letters Patent are hereby corrected as shown below:

Column 2, Line 15, delete "audile" and insert --audible--.

In The Claims.

Column 4, Line 36, delete "sad" and insert --said--.

Signed and sealed this 25th day of May 1971.

(SEAL)
Attest:

EDWARD M.FLETCHER,JR.
Attesting Officer

WILLIAM E. SCHUYLER, JR.
Commissioner of Patents